United States Patent Office 3,222,196
Patented Dec. 7, 1965

3,222,196
BURNED BRICK
Ben Davies and Ernest P. Weaver, Pittsburgh, Pa., assignors to Harbison-Walker Refractories Company, Pittsburgh, Pa., a corporation of Pennsylvania
No Drawing. Filed Oct. 29, 1963, Ser. No. 319,697
13 Claims. (Cl. 106—58)

This invention relates to ceramically bonded basic refractory brick. It further relates to a ceramically bonded brick containing a substantial amount of CaO, on an oxide basis. In a particular aspect of this invention, it relates to improved ceramically bonded or burned basic refractory brick made from a refractory batch consisting in large part of dead burned dolomite.

Problems involved in the manufacture of ceramically bonded or burned refractory brick made from MgO and CaO containing raw materials, and particularly from dead burned dolomite grain, are well known in the art. Considering dolomite as an example, problems practically all stem from the affinity that the calcia in dead burned dolomite has for moisture with concomitant disintegration due to the expansion caused by hydration upon exposure to the atmosphere. Repeated attempts have been made to inhibit this reaction so as to take advantage of the very high melting point and, thus, superior refractoriness of dolomite. Most of these attempts have involved the use of various amounts of chemical additives, fluxes, sintering or dead burning agents, such as mill scale, iron oxide, silica, clay, etc., which additives, while inhibiting hydration of the lime or calcia in the dolomite, have substantially reduced the refractoriness thereof, and, in some instances, limited the possible areas of use because of high impurity content. This is particularly true when mill scale or iron oxide has been used. The patent literature is replete with disclosure of how to stabilize lime and high lime content materials such as dolomite. However, the prior art has seemed to indicate that hydration resistance is usually obtained only by elimination of free lime or calcia, by reacting it with various metal oxides at the sacrifice of refractoriness.

By way of term definition, when we herein refer to dolomite, we intend to describe the natural mineral dolomite, which has on the order of a 1 to 1 molar ratio of $MgCO_3$ and $CaCO_3$, and which, when heated with or without fluxing material (sometimes termed sintering agents or dead burning agents) to a temperature sufficiently high and for a long enough period of time to decompose the carbonate structure and drive off all water, yields a mixture of calcium oxide (CaO) and magnesium oxide (MgO). A material so treated is termed "dead burned dolomite" in the art. This mixture can be mineralogically characterized as an intimate mixture of calcium oxide and periclase, this latter term describing the stable, highly crystalline form of MgO, which results from a dead burning treatment.

We also intend, by the terminology "dead burned dolomite," to include a synthetic material which is made by mixing calcium oxide and magnesium oxide, such as that derived from seawater, bitterns, brines and the like, to obtain about a 1 to 1 molar ratio of CaO to MgO.

It is known that burned basic brick (which is generically descriptive of those including a substantial amount of dead burned dolomite) frequently possess much greater strength than unburned brick due to the ceramic bond which is formed during the firing or burning process. Thus, particularly with the contemporary advent of such as extremely large oxygen steelmaking furnaces, it is desirable that the required basic brick be of the ceramically bonded or burned type rather than the chemically bonded unburned type or, more commonly, of the tar bonded type. For example, in some of the newer oxygen converter furnaces or vessels, in the lower rings or courses of the lining thereof, the pressure on brick making up such a ring may exceed 40 p.s.i.

It is, therefore, an object of this invention to provide ceramically bonded basic refractory brick containing a substantial amount of dead burned dolomite, which brick are resistant to hydration and are of superior strength. It is another object to provide a novel process of obtaining such brick. It is yet another object of the invention to provide ceramically bonded basic refractory brick containing from 60 to 100% of dead burned dolomite, which brick exhibit superior resistance to hydration during extended exposure to the atmosphere. It is still further an object of the invention to provide a novel temporary bonding system useful in the manufacture of ceramically bonded basic refractory brick made substantially entirely from material of the group (1) dead burned dolomite, (2) dead burned magnesia, (3) dead burned magnesia having up to about 5% of CaO and $SiO_2$ in a weight ratio between 3 to 1 and 4 to 1, and having no more than about 1% total of $Al_2O_3$ and $Fe_2O_3$, (4) hard burned lime (calcia), and (5) mixtures of (1), (2), (3), and (4).

Briefly, according to one aspect of this invention, it has been discovered that high purity refractory grain consisting substantially entirely of dead burned dolomite and having essentially less than 1% loss of weight on ignition (this indicates a very dry grain having substantially no water) can be easily made into hydration resistant and strong, ceramically bonded brick, by the use of a novel temporary bonding system. This bonding system is a mixture of particular nonaqueous, cokable, carbonaceous bonding materials of which from 1 to 2 parts consist of a selected fatty acid pitch.

The terminology "fatty acid pitch" is, generally, used to describe residual material obtained in fractional distillation of animal and vegetable materials, such as lard, tallow, palm oil and other vegetable oils, bone fat, garbage and sewage, wool grease and packing house waste. The residual material which is termed fatty acid pitch is usually a dark brown to black, uniform to lumpy, gritty and thick material substantially free of fatty acids.

The fatty acid pitches, which are used in this invention, according to a preferred embodiment, contain from 10 to 20% of free fatty acids, have an acid number of from 20 to 40, an iodine value of 10 maximum, and are comprised of from 10 to 30% of unsaponifiable organic material. They are sometimes termed saturated pitches and are obtained from the distillation of animal derived fatty acids, but may contain pitch derived from the distillation of fish oil or vegetable fatty acids. The fatty acid pitches of this invention, further, soften at a temperature of at least about 120° F. They should soften below about 450° F., and preferably at less than 250° F. The pitches of this invention, further, consist essentially of carbon, hydrogen, oxygen and nitrogen atoms, and are solid at room temperature (nominally 70° F.).

The other nonaqueous, cokable, carbonaceous materials which are mixed with our selected, particular, fatty acid pitches, are selected from the group medium pitch and hard pitch. The medium pitch and hard pitch can be derived from petroleum or coal. The medium pitch will be understood by those skilled in the art to be that which has a softening point between 150 and 250° F., and the hard pitch as that which has a softening point within the range 275 to 450° F. We prefer to use medium pitch.

No more than about 4 parts, by weight, of total carbonaceous bonds are used, and no more than 2 parts of the bonds should be the fatty acid pitch. We find best results are obtained when medium pitch and fatty acid pitch are mixed in about a 3 to 1 weight ratio. To parts of fatty acid pitch, alone, have been found to give satisfactory results. We know that up to about 5 parts by weight of the mixture can be used but as 5 parts by weight is approached, the porosity of a resulting burned brick is usually higher than is desired, slumping of the shape sometimes occurs during burning, and undesirable kiln setter spotting can occur. Thus, in a broad aspect, up to, but no more than, 5 parts by weight of the mixture can be used.

In a series of tests, we studied various bonds and mixtures of bonds from the group paraffin wax, fatty acid pitch (this is derived from distillation of fatty acid from animal or vegetable material), powdered hard pitch, and medium pitch. The refractory material was the same in each batch. Those refractory batches to which the paraffin wax was added developed a high electrostatic charge at the press, causing the press to chatter excessively, and resulted in lower density in pressed brick. We surmised the lower density to be due to repulsion of electrostatically charged particles. All of the other carbonaceous bonding materials gave satisfactory density off the press (between 176 and 183 p.c.f.). However, only brick made from batches bonded with a carbonaceous material including the fatty acid pitch of this invention, survived burning without cracking.

For example, a batch was prepared consisting entirely of dead burned dolomite, having less than about 2% impurities, the remainder being CaO and MgO, by weight on an oxide analysis, in about a 1 to 1 molar ratio. The size grading of the batch was substantially as follows: $-4 +10$ mesh—25%, $-10 +28$ mesh—40%, $-28$ mesh—35%, with 40 to 60% of the $-28$ mesh fraction passing a 325 mesh screen. This should be considered an exemplary sizing only. Those skilled in the art will understand that modification can be made in it and brick will still be obtained. Brick were made from this material using various carbonaceous bonding systems. For example, to a first batch 4 parts, by weight, of medium pitch was added. Brick made from this batch were burned at 2500° F. Modulus of rupture, at room temperature, of the resulting brick was 1920 p.s.i. Another brick was made from the same grain material, but 2 parts of our fatty acid pitch, above described, were used as the bonding material. The same manufacturing and firing techniques were used. After firing, these brick had a modulus of rupture at room temperature of 3470 p.s.i.

In another batch of the same dolomite grain, paraffin wax was added as the bond. The paraffin had been heated to a liquid state. The brick was fired to a temperature of 2820° F. The fired brick was so badly cracked as to not be susceptible to testing for modulus of rupture.

The following examples set forth satisfactory dolomite, magnesia and dolomite-magnesia brick batch mixtures fabricated according to this invention.

*Example I*

A size graded mixture is prepared of dead burned dolomite consisting of at least 97% CaO+MgO, the remainder being loss on ignition, $SiO_2$, $Al_2O_3$ and $Fe_2O_3$. The mixture is so size graded that a major portion is $+28$ mesh and a minor portion is $-28$ mesh. Preferably, on the order of about 50 to 65% will be $-4 +28$ mesh. Of the remaining material which passes a 28 mesh screen, from 40 to 60% is desirably $-325$ mesh. To this size graded batch of dead burned dolomite is added 2 parts, by weight, of the fatty acid pitch of this invention.

*Example II*

The size graded dead burned dolomite of Example I, to which is added from 1 to 2 parts of the fatty acid pitch of this invention, the remainder being powdered hard pitch, to a total of 4 parts of bond.

*Example III*

The size graded dead burned dolomite of Example I bonded with from 1 to 2 parts of the fatty acid pitch of our invention and from 3 to 2 parts of medium pitch, the total of fatty acid pitch and medium pitch being no more than 5 parts, by weight, and preferably no more than 4 parts, by weight, of the resulting batch of refractory grain and carbonaceous bonds.

*Example IV*

A size graded mixture consisting entirely of dead burned magnesia analyzing at least 97% MgO, the remainder being loss on ignition $Al_2O_3$ and $Fe_2O_3$. The magnesia is size graded in substantially the same manner as the dolomite of Example I. This size graded magnesia is bonded with any of the systems of Examples I through III.

*Example V*

Example IV using a dead burned magnesia of at least about 90% MgO, by weight on an oxide basis.

*Example VI*

A batch is prepared of the dolomite of Example I and a dead burned high purity magnesia. The magnesia analyzes, on an oxide analysis, at least about 95% MgO, the remainder being substantially entirely CaO and $SiO_2$ but in which the CaO and $SiO_2$ are present in a weight ratio between about 3 to 1 and about 4 to 1, and there being no more than about 1% of $Al_2O_3$ and $Fe_2O_3$. This magnesia constitutes up to about 50%, by weight, of the total batch and, preferably, constitutes between 5 and 40%, by weight, of the batch. The overall size grading of the batch is substantially the same as Example I, but the magnesia is preferably in the $-28$ fraction of the batch. The carbonaceous bonding systems of any of Examples I through III are mixed with the batch. This is a preferred embodiment of the invention.

*Example VII*

The magnesia of Example VI is size graded substantially the same as the dolomite of Example I. Any of the carbonaceous bonding systems of Examples I through III are used as the bonding agent.

The batches of all of the examples, just mentioned, can be made in the following manner: The bonding system is heated to a fluid state, preferably at about 200–250° F., but this, of course, varies, depending on whether or not powdered hard pitch or medium pitch is used with our fatty acid pitch. While heated and in a fluid state, the bonding system and size-graded refractory grain are intimately mixed and formed into brick on a mechanical press at about 800 p.s.i. The brick are burned to a temperature sufficient to eliminate the carbonaceous bonding ingredients, and result in a ceramically bonded brick. This temperature is, preferably, in the range 2500 to 3000° F. We normally suggest that the brick enter into the kiln as soon as practical after pressing within an hour, for example. In the case of brick having a substantial amount of dolomite (over about 25%, by weight) we suggest they be heated in a desiccated atmosphere (an atmosphere free of water) to a temperature of at least 800 to 1000° F. before they are burned to the maximum temperature of between 2500 and 3000° F.

Having thus described the invention in detail and with sufficient particularity as to enable those skilled in the art to practice it, what is desired to have protected by Letters Patent is set forth in the following claims.

We claim:

1. That method of making a ceramically bonded refractory brick of refractory material selected from the group consisting of dead burned dolomite and dead burned magnesia which comprises initially bonding the refractory with a mixture of from 0 to 3 parts of a member of the group consisting of medium pitch and hard pitch and from 1 to 2 parts of fatty acid pitch, the medium pitch having a softening point between 150 and 250° F., the hard pitch having a softening point between 250 and 450° F., the fatty acid pitch having a softening point of between 120 and 450° F., the fatty acid pitch being derived from the distillation of materials of the group consisting of animal fatty acids, fish oil, and vegetable fatty acids, the mixture of fatty acid pitch, medium pitch, and hard pitch being heated to a fluid state before mixing with the refractory, firing the bonded mixture of refractory and pitch to a temperature sufficient to obtain ceramic bonding through the refractory, and for a time period sufficient to eliminate the pitches and any carbonaceous residue.

2. That method of making a ceramically bonded refractory brick of refractory material selected from the group consisting of dead burned dolomite and dead burned magnesia which comprises initially bonding the refractory with a mixture of from 0 to 3 parts of a member of the group consisting of medium pitch and hard pitch and from 1 to 2 parts of fatty acid pitch, the medium pitch having a softening point in the range 150 and 250° F., the hard pitch having a softening point in the range 250 and 450° F., the fatty acid pitch having a softening point of between 120 and 450° F., the fatty acid pitch being derived from the distillation of materials of the group consisting of animal fatty acids, fish oil, and vegetable fatty acids, the mixture of fatty acid pitch, medium pitch, and hard pitch being heated to a fluid state before mixing with the refractory, firing the bonded mixture of refractory and pitch to a temperature sufficient to obtain ceramic bonding through the refractory.

3. That method of making a ceramically bonded refractory brick of refractory material selected from the group consisting of dead burned dolomite and dead burned magnesia which comprises initially bonding the refractory with a mixture of from 0 to 3 parts of a member of the group consisting of medium pitch and hard pitch and from 1 to 2 parts of fatty acid pitch, the medium pitch having a softening point in the range 150 and 250° F., the hard pitch having a softening point in the range 250 and 450° F., the fatty acid pitch having a softening point of above 120° F., an acid number of from 20 to 40, an iodine value of 10 maximum, containing 10 to 20% of free fatty acids, and comprised of from 10 to 30% unsaponifiable organic material, the mixture of fatty acid pitch, medium pitch, and hard pitch being heated to a fluid state before mixing with the refractory, firing the bonded mixture of refractory and pitch to a temperature sufficient to obtain ceramic bonding through the refractory.

4. That method of making a ceramically bonded refractory brick of refractory material selected from the group consisting of dead burned dolomite and dead burned magnesia which comprises initially bonding the refractory with a mixture of from 0 to 3 parts of hard pitch and from 1 to 2 parts of fatty acid pitch, the hard pitch having a softening point between 250 and 450° F., the fatty acid pitch having a softening point of between 120 and 450° F., the fatty acid pitch being derived from the distillation of materials of the group consisting of animal fatty acids, fish oil, and vegetable fatty acids, the mixture of fatty acid pitch and hard pitch being heated to a fluid state before mixing with the refractory, firing the bonded mixture of refractory and pitch to a temperature sufficient to obtain ceramic bonding through the refractory.

5. The method of claim 1 in which the refractory mixture is bonded with 1 to 2 parts, by weight, of heated fatty acid pitch.

6. That method of making a ceramically bonded refractory brick of dead burned dolomite which comprises initially bonding the dolomite with a mixture of from 0 to 3 parts of a member of the group consisting of medium pitch and hard pitch, and from 1 to 2 parts of fatty acid pitch, the medium pitch having a softening point between 150 and 250° F., the hard pitch having a softening point between 250 and 450° F., the fatty acid pitch having a softening point of between 120 and 450° F., the fatty acid pitch being derived from the distillation of materials of the group consisting of animal fatty acids, fish oil, and vegetable fatty acids, the mixture of fatty acid pitch, medium pitch, and hard pitch being heated to a fluid state before mixing with the dolomite, firing the bonded dolomite to a temperature sufficient to obtain ceramic bonding in the dolomite.

7. The method of claim 6 in which the dolomite is size graded to provide a batch in which from 50 to 65% is +65 mesh, the remainder being −65 mesh.

8. That method of making a ceramically bonded refractory brick of refractory material selected from the group consisting of (1) dead burned dolomite, (2) dead burned magnesia, (3) dead burned magnesia having up to about 5% of CaO and $SiO_2$, by weight on an oxide basis, and in a weight ratio between about 3 to 1 and 4 to 1, and having no more than about 1%, by weight on an oxide basis, total of $Fe_2O_3$ and $Al_2O_3$, (4) hard burned lime, and (5) mixture of (1), (2), (3), and (4), which comprises initially bonding the refractory with a mixture of from 0 to 3 parts of a member of the group consisting of medium pitch and hard pitch and from 1 to 2 parts of fatty acid pitch, the medium pitch having a softening point between 150 and 250° F., the hard pitch having a softening point between 250 and 450° F., the fatty acid pitch having a softening point of between 120 and 450° F., the fatty acid pitch being derived from the distillation of materials of the group consisting of animal fatty acids, fish oil, and vegetable fatty acids, the mixture of fatty acid pitch, medium pitch, and hard pitch being heated to a fluid state before mixing with the refractory, firing the mixture of refractory and pitch to a temperature sufficient to obtain ceramic bonding through the refractory.

9. The method of claim 8 in which the refractory is entirely magnesia.

10. The method of claim 8 in which the refractory is entirely dead burned magnesia having up to about 5% of CaO and $SiO_2$, by weight on an oxide basis, and in a weight ratio between about 3 to 1 and 4 to 1, and having no more than about 1%, by weight on an oxide basis, total of $Fe_2O_3$ and $Al_2O_3$.

11. The method of claim 8 in which the refractory is bonded with from 1 to 2 parts by weight of the fatty acid pitch.

12. The method of claim 8 in which the bonded refractory is burned at a temperature in the range 2500 to 3000° F.

13. The method of claim 12 in which the bonded mixture is heated in a desiccated atmosphere to a temperature in the range 800 to 1000° F. before firing.

References Cited by the Examiner

UNITED STATES PATENTS

| | | | |
|---|---|---|---|
| 2,222,188 | 11/1940 | White | 106—56 |
| 3,030,228 | 4/1962 | Hernandez et al. | 106—58 |

TOBIAS E. LEVOW, *Primary Examiner.*